L. K. SELTZER & J. O. STÄHR.
HIGH LEVEL INDICATOR FOR LIQUIDS.
APPLICATION FILED NOV. 20, 1913.
1,116,934. Patented Nov. 10, 1914.
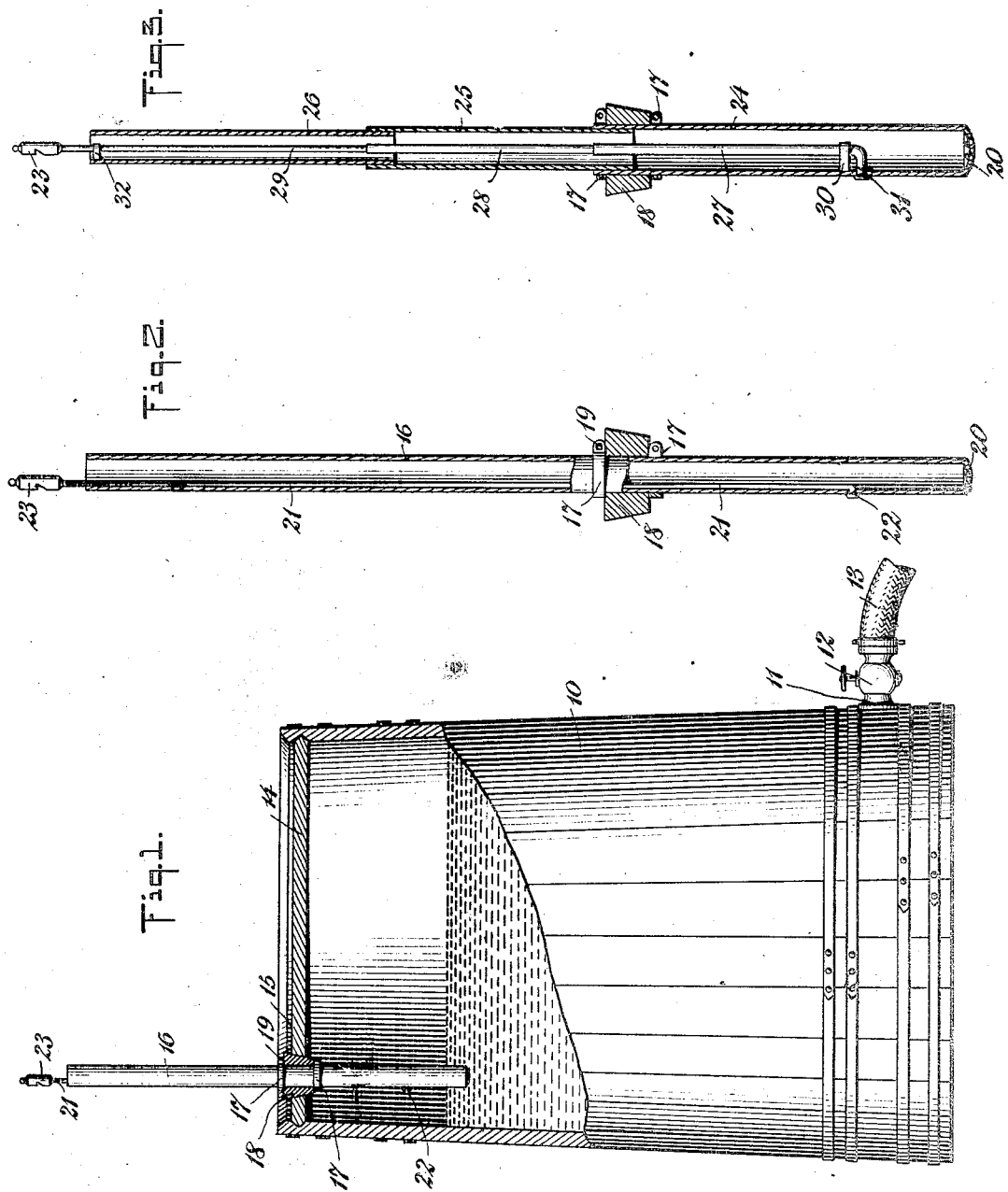

UNITED STATES PATENT OFFICE.

LUTHER K. SELTZER, OF YONKERS, NEW YORK, AND JOHN O. STÄHR, OF HAGERSTOWN, MARYLAND.

HIGH-LEVEL INDICATOR FOR LIQUIDS.

1,116,934. Specification of Letters Patent. Patented Nov. 10, 1914.

Application filed November 20, 1913. Serial No. 802,057.

*To all whom it may concern:*

Be it known that we, LUTHER K. SELTZER and JOHN O. STÄHR, both citizens of the United States, and residents, respectively of Yonkers, in the county of Weschester and State of New York, and of Hagerstown, in the county of Washington and State of Maryland, have invented a new and Improved High-Level Indicator for Liquids, of which the following is a full, clear and exact description.

In the present method of filling vats or tanks with beer in breweries, the beer is fed from a suitable storage tank in which the beer is fermented, to vats or tanks in which the beer is aerated, the beer being fed in at the bottom and the vat or tank having a vent at the top to permit the escape or discharge of air displaced by the beer. Under the present mode the attendant must watch while a vat or cask is filling, and in order to ascertain whether or not the vat is full or nearly so, he raps on the side of the vat and determines the height of the liquid by the sound. This often results in the overflow of the vat or cask and consequent loss of the beer or liquid, as well as requiring constant attention of the attendant.

My invention consists of an improved high level indicator to be applied to the vat to warn the attendant when the beer is approaching the top of the vat, so that with the device in position in the usual vent hole and the filling pipe connected to the vat, the attendant may spend or occupy his time in any other work until the audible signal is given for the cutting off of the flow.

A further object of the invention is to provide an indicator or audible signaling device to indicate a high level in vats or receptacles to be filled with beer or other liquid, which is removable and adjustable to extend down into the receptacle at varying distances whereby when the liquid approaches a predetermined point a water seal will be formed to close the lower end of a tube forming a part of the device so as to cause the escape of the air and gases through a restricted outlet to sound an audible signal or whistle.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views.

Figure 1 is a side elevation of a vat or cask, partly in section with my improved high level indicator applied thereto; Fig. 2 is an enlarged vertical sectional view of the improved indicator partly in elevation; and Fig. 3 is a similar view of a modified structure.

In the drawings, the numeral 10 indicates a vat or cask commonly employed in breweries, for containing beer, although it is obvious that any other receptacle or tank may be equally well adapted to be filled in connection with the improved device. The vat is provided at a suitable point, preferably near its bottom, with an inlet 11 having a controlling valve 12, and the numeral 13 designates a pipe or hose connected with a suitable supply or tank for discharging the beer into the vat 10. The vat 10 may be filled from any point, but preferably from the bottom, for purposes of convenience in attaching and removing the hose, and its cover or top portion 14 is provided with the usual vent opening 15 through which, in the usual way of filling these vats, the air and gases displayed by the beer escape.

In my improved device, an elongated tube 16 is provided, the same being constructed of a single section of rigid material such as metal, or of flexible material such as rubber, when it is necessary to position the tube in the vent opening where the top of the vat is located in close proximity to a wall, or in cramped spaces. A pair of adjustable clamps 17 are mounted on the tube 16 and are adapted to hold a stopper or bushing 18 against longitudinal movement on the tube, the clamps being provided with binding screws 19 for tightly securing them to the tube in contact with the upper and lower faces of the stopper. The lower end of the tube as well as the upper end is open to permit the free escape of the air and gases through the tube, but said lower end may be provided with a reticulated portion 20 sufficient to permit the free escape of the air and excluding the liquid.

Secured within the outer tube 16 is an inner tube 21 of somewhat restricted diameter, the inner tube being secured to the outer tube in close proximity to its inner wall and having its lower end directed outwardly, as shown at 22, so as to be supported and to communicate with the interior of the vat. By adjusting the stopper 18 on the tube 16, the distance which the indicating device or gage extends down into the vat can be regulated so that the signal will be given when the liquid reaches a predetermined height. The essential advantage of this is that the indicator or gage is movable so that the gage can be lowered deeper into the cask or vat, or raised to whatever level the user desires. The inner tube 21 also extends outwardly of the outer tube and above the same, and has mounted on its upper end a whistle or other audible signaling device 23 designed to be operated by the escape of air through the tube 21. Thus, with the device in the position shown in Fig. 1 as the cask or vat is being filled and the liquid rises therein, the air is expelled through the tube 16, this being the larger escape opening, so that the air might escape quite freely. As soon as the liquid or beer reaches a level above the lower end of the tube 16, a water seal is formed so that further escape of the air through the tube 16 is prevented. This air escapes through the tube 21 under great pressure, and in passing through the whistle 23, will operate the latter to warn the attendant to cut off the supply. The attendant's time in the meantime may be spent in doing other work, and the time of operation of the signal may be regulated to accord with the distance the attendant is away from the vat, by the adjustment heretofore described. By closing the valve 12 and disconnecting or uncoupling the hose 13, the hose is attached to another cask or vat in which the gage is also placed and the filling operation is continued in a similar manner.

Where the tube 16 is of rigid material, it is assumed that there is sufficient space above the vat to permit the tube to be passed into the vent opening, but in cramped places or when the top of the vat is located in close proximity to the ceiling, a device constructed of flexible material such as rubber, including the inner tube 21, is used and the device bent in any desired shape. This advantage is further carried out by the construction shown in Fig. 3 of the drawings wherein the tube substituted in lieu of the tube 16 comprises a plurality of telescoping sections 24, 25 and 26, fitted one within the other, while the inner tube embodies telescoping sections 27, 28 and 29, all designed by their frictional engagement within each other to be held against longitudinal displacement or telescoping movement due to their weight. The stopper 18 is carried by the lower section 24 in which the section 25 telescopes, while the section 26 telescopes in the section 25. The section 27 of the inner tube is anchored as shown at 30 to the lower tube section 24 and also extends laterally as shown at 31 exteriorly of the outer tube at a spaced distance from the lower end of the latter in the same manner as the tube 21 is mounted. The section 28 telescopes in the section 27 and is supported by the frictional engagement of the parts alone, while the section 29 carrying the whistle or audible signaling device 23 is fixed to the top section 26 as shown at 32, thus permitting the parts to telescope simultaneously for use in cramped places as heretofore described, or to occupy a minimum of space when not in use.

Having thus described our invention, we claim as new and desire to secure by Letters Patent:

1. A high level indicator for liquids, comprising a tube having open ends, a tube of reduced diameter mounted in the first-mentioned tube and communicating exteriorly thereof near its lower end, and an audible signaling device carried by the upper end of the second-named tube.

2. A high level indicator for liquid-containing vats having a suitable inlet and a vent opening near the top thereof, comprising a tube having a continuously open bore, means mounted on the tube for supporting the same within the vent opening, a tube of restricted size mounted in the first-mentioned tube and communicating exteriorly thereof at a spaced point from its lower end, and a signaling device carried by the upper end of the second-mentioned tube whereby when the liquid in the tank reaches a level above the lower end of the first-mentioned tube through which air is permitted to freely escape during the filling of the tank, said air will be forced through the second-mentioned tube to operate the signal.

3. A high level indicator of the class described, comprising a tube having an open upper end and an apertured lower end, a stopper adjustably mounted on the tube, a tube of restricted diameter carried by the first-mentioned tube, and an audible signaling device mounted on the upper end of said tube exteriorly of the first-mentioned tube.

4. A high level indicator of the class described, comprising a tube having an open upper end and an apertured lower end, a stopper adjustably mounted on the tube, a tube of restricted diameter carried by the first-mentioned tube, and an audible signaling device mounted on the upper end of said tube exteriorly of the first-mentioned tube, said tubes embodying telescoping sections.

5. A high level indicator of the class described, comprising a tube having an open upper end and an apertured lower end, a stopper adjustably mounted on the tube, a tube of restricted diameter carried by the first-mentioned tube, and an audible signaling device mounted on the upper end of said tube exteriorly of the first-mentioned tube, said tubes being designed to be shortened in relation to their projection from the receptacle.

In testimony whereof we have signed our names to this specification in the presence of two subscribing witnesses.

LUTHER K. SELTZER.
JOHN O. STÄHR.

Witnesses to the signature of Luther K. Seltzer:
ALFRED G. BOHM,
JOSEPH B. MILLER.

Witnesses to the signature of John O. Stähr:
M. RANDOLPH KOHN,
JNO. C. O'CONNELL.